United States Patent
Zhu et al.

(10) Patent No.: US 11,026,062 B2
(45) Date of Patent: Jun. 1, 2021

(54) MOBILE TERMINATING SHORT MESSAGE SERVICE RE-TRANSMISSION MANAGEMENT

(71) Applicant: Apple Inc., Cupertino, CA (US)

(72) Inventors: Yifan Zhu, San Jose, CA (US); Utkarsh Kumar, Fremont, CA (US); Lakshmi N. Kavuri, San Jose, CA (US); Shivani Suresh Babu, San Jose, CA (US); Hariharan Sukumar, San Diego, CA (US); Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 16/403,699

(22) Filed: May 6, 2019

(65) Prior Publication Data
US 2019/0357019 A1    Nov. 21, 2019

Related U.S. Application Data

(60) Provisional application No. 62/672,503, filed on May 16, 2018.

(51) Int. Cl.
*H04W 4/14* (2009.01)
*H04W 8/02* (2009.01)

(52) U.S. Cl.
CPC .............. *H04W 4/14* (2013.01); *H04W 8/02* (2013.01)

(58) Field of Classification Search
CPC .......... H04W 4/14; H04W 8/02; H04W 88/06
See application file for complete search history.

(56) References Cited

U.S. PATENT DOCUMENTS

| 9,204,269 B1 * | 12/2015 | Cham ................ H04L 65/1073 |
| 9,860,720 B2 | 1/2018 | Maria | |
| 9,973,907 B1 | 5/2018 | Cham | |
| 2004/0048629 A1 * | 3/2004 | Yoon .................. H04W 88/184 |
| | | | 455/466 |

(Continued)

FOREIGN PATENT DOCUMENTS

| CN | 101998313 A | 3/2011 |
| CN | 106686561 A | 5/2017 |

OTHER PUBLICATIONS

Extended European Search Report, European Patent Application 19174415.0, dated Jun. 11, 2019; seven pages.

(Continued)

*Primary Examiner* — Brandon J Miller
(74) *Attorney, Agent, or Firm* — Kowert, Hood, Munyon, Rankin & Goetzel, P.C.

(57) ABSTRACT

This disclosure relates to techniques for managing mobile-terminating short message service re-transmissions for wireless devices. A cellular network entity of a cellular network may receive a request to provide a short message service message to a wireless device. The wireless device may be registered with the cellular network entity via at least two access types. An attempt to provide the short message service message to the wireless device via a first access type may be performed. An attempt to provide the short message service message to the wireless device via a second access type may be performed if the attempt to provide the short message service message to the wireless device via the first access type is unsuccessful.

20 Claims, 11 Drawing Sheets

(56) References Cited

U.S. PATENT DOCUMENTS

| | | | |
|---|---|---|---|
| 2011/0185237 A1* | 7/2011 | Mahdi | H04L 51/14 |
| | | | 714/49 |
| 2011/0230212 A1 | 9/2011 | Cai | |
| 2012/0236709 A1* | 9/2012 | Ramachandran | H04W 76/18 |
| | | | 370/221 |
| 2017/0171814 A1 | 6/2017 | Belghoul | |
| 2019/0357020 A1* | 11/2019 | Chandramouli | H04W 60/00 |

OTHER PUBLICATIONS

Office Action for Chinese Application No. 201910408277.0, dated Mar. 30, 2021, 6 pages.

\* cited by examiner

MOBILE TERMINATING SHORT MESSAGE
SERVICE RE-TRANSMISSION
MANAGEMENT

PRIORITY INFORMATION

This application claims priority to U.S. provisional patent application Ser. No. 62/672,503, entitled "Mobile Terminating Short Message Service Re-Transmission Management," filed May 16, 2018, which is hereby incorporated by reference in its entirety as though fully and completely set forth herein.

TECHNICAL FIELD

The present application relates to wireless communication, including to techniques for managing short message service re-transmissions for wireless devices.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of, inter alia, systems, apparatuses, and methods for managing short message service (SMS) re-transmissions for wireless devices.

The techniques described herein may provide various framework options for handling SMS re-transmissions, including options that can support handling scenarios in which a wireless device is registered with a cellular network via multiple access types.

One possible framework may include an approach in which a SMS function handles re-transmission instructions and access type selection. In such an approach, when the SMS function has a SMS message for a wireless device, the SMS function may instruct a mobility function with which the wireless device is registered to provide the SMS via a specific access type. If delivery of the SMS message via the specified access type is unsuccessful, the SMS function may instruct the mobility function to provide the SMS via a different specific access type.

As another possibility, the SMS function may handle re-transmission instructions but the mobility function may handle access type selection. In such an approach, when the SMS function has a SMS message for a wireless device, the SMS function may instruct the mobility function with which the wireless device is registered to provide the SMS without specifying an access type. If delivery of the SMS message is unsuccessful and the mobility function has at least one other access type available for the wireless device, the mobility function may inform the SMS function that a temporary delivery failure of the SMS message occurred. In this case, the SMS function may instruct the mobility function to re-try delivering the SMS, and the mobility function may re-try using a different access type than in the initial attempt.

As a still further possibility, the mobility function may handle both the re-transmission decision-making and the access type selection. In such an approach, when the SMS function has a SMS message for a wireless device, the SMS function may instruct the mobility function with which the wireless device is registered to provide the SMS without specifying an access type. If delivery of the SMS message is unsuccessful and the mobility function has at least one other access type available for the wireless device, the mobility function may attempt to deliver the SMS message using a different access type than in the initial attempt. Thus, the mobility function may use its own decision logic to continue further delivery attempts (e.g., as potentially justified by the availability of further access types) until the delivery succeeds or the mobility function determines that the SMS message could not be successfully delivered, and may report back to the SMS function after such successful or unsuccessful delivery.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
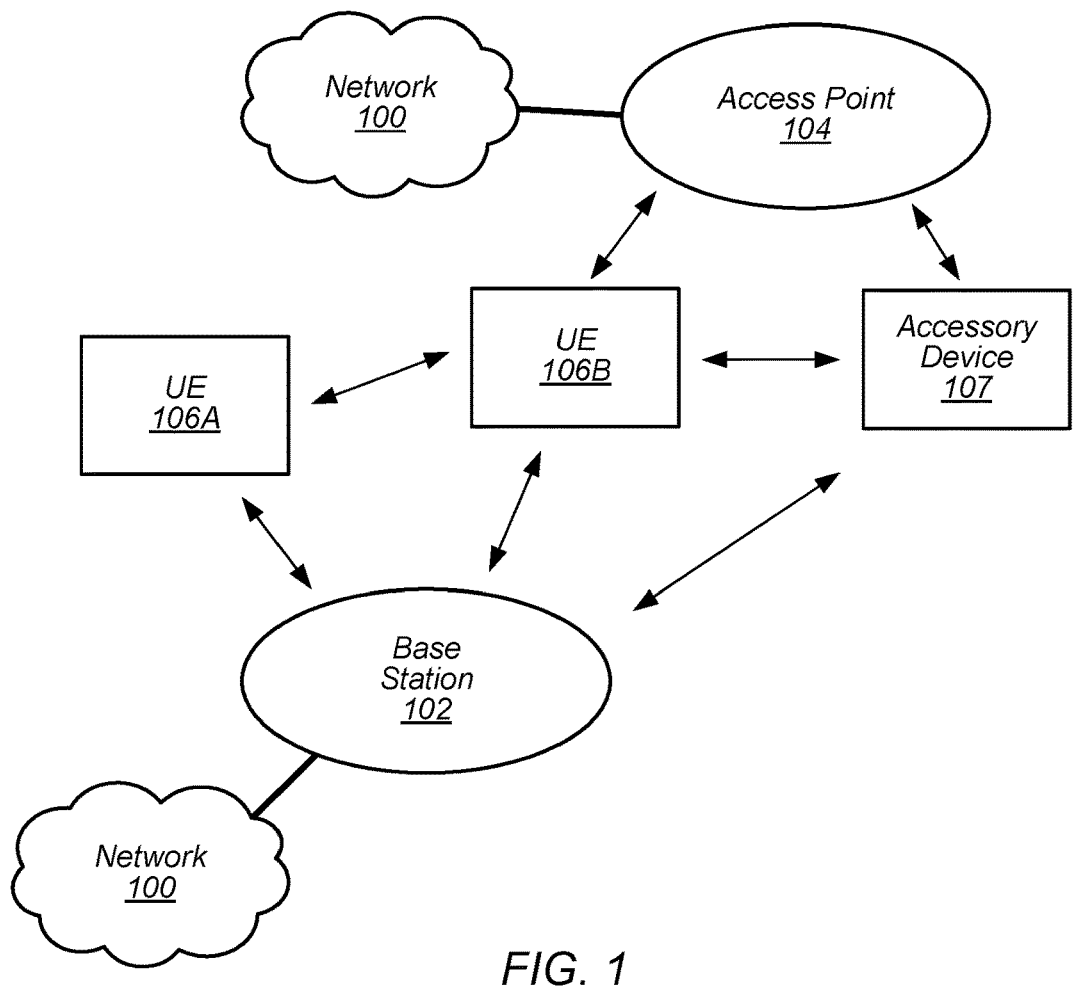
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g. in a user equipment device or in a cellular network device. Processing elements may include, for example, processors and associated memory, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
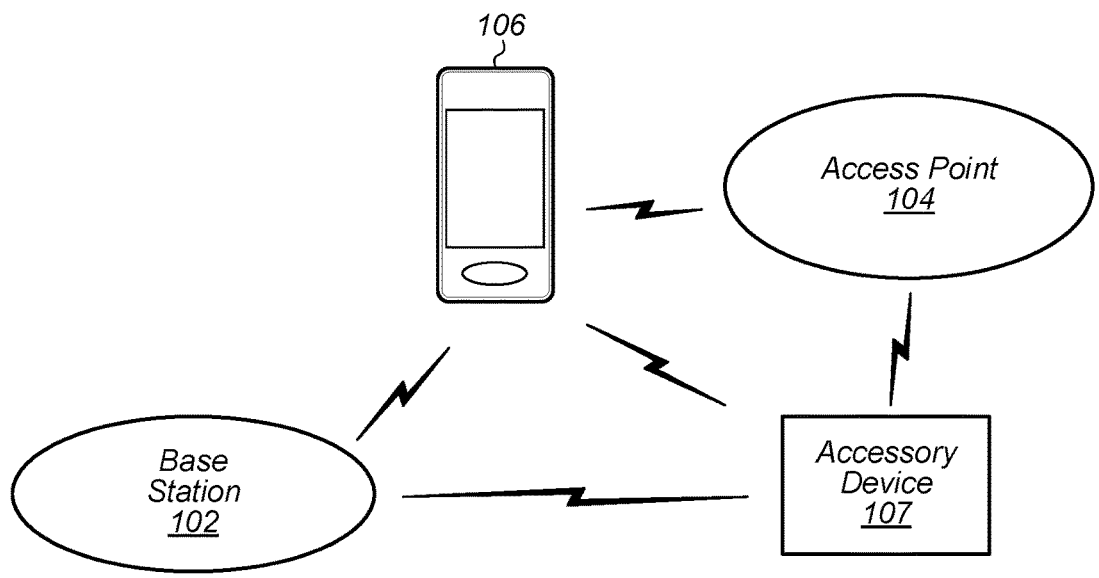
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more (e.g., an arbitrary number of) wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

As shown, the exemplary wireless communication system also includes a Wi-Fi access point 104, which communicates over a transmission medium with the wireless device 106B as well as accessory device 107. The Wi-Fi Access point also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100, and/or may prioritize access to the network 100 obtained via the access point 104. In other words, the accessory device 107 may selectively use the cellular communication capabilities of its companion device (e.g., UE 106B) and/or its Wi-Fi communication capability to conduct its communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may have cellular communication capability and be capable of directly communicating with the base station 102, as shown. FIG. 2 also illustrates the accessory device 107 in communication with access point 104. The accessory device 107 may also have Wi-Fi communication capability and be capable of directly communicating with the access point 104, as shown.

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102 and/or access point 104. In other words, the accessory device 107 may provide voice/data packets intended for the base station 102 or access point 104 over the short range link to the UE 106, and the UE 106 may use its cellular or Wi-Fi functionality to transmit (or relay) this voice/data to the base station/access point on behalf of the accessory device 107. Similarly, the voice/data packets transmitted by the base station/access point and intended for the accessory device 107 may be received by the cellular/Wi-Fi functionality of the UE 106 and then may be relayed over the short range link to the accessory device. As noted above, the UE 106 may be a mobile phone, a tablet, or any other type of hand-held device, a media player, a computer, a laptop or virtually any type of wireless device.

At least in some instances, the accessory device 107 may also or alternatively selectively utilize one or the other of cellular or Wi-Fi communication capability to communicate directly with a cellular base station or a Wi-Fi access point, e.g., even if both options may be available. For example, if both wireless link options are available and are capable of providing the communication services currently desired by the accessory device 107, the accessory device 107 might prioritize the Wi-Fi link, e.g., to potentially reduce device power consumption and/or if the Wi-Fi link is considered to have a lower economic cost. As described further subsequently herein, the UE 106 and/or the accessory device 107 may manage the wireless connectivity of the accessory device 107 in accordance with any of a variety of additional or alternative considerations at various times.

The UE 106 and/or 107 may include a device or integrated circuit for facilitating cellular communication, referred to as a cellular modem. The cellular modem may include one or more processors (processor elements) and various hardware components as described herein. The UE 106 and/or 107 may perform any of the method embodiments described herein by executing instructions on one or more programmable processors. Alternatively, or in addition, the UE 106 and/or 107 may include one or more programmable hardware elements such as an FPGA (field-programmable gate array), an integrated circuity, and/or any of various other possible hardware components that are configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities). Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs, and/or may otherwise selectively utilize its wireless communication capabilities. As previously noted, when the UE 106 is capable of being used by the accessory device 107 as a proxy, the UE 106 may be referred to as a companion device to the accessory device 107.

Figure 3:
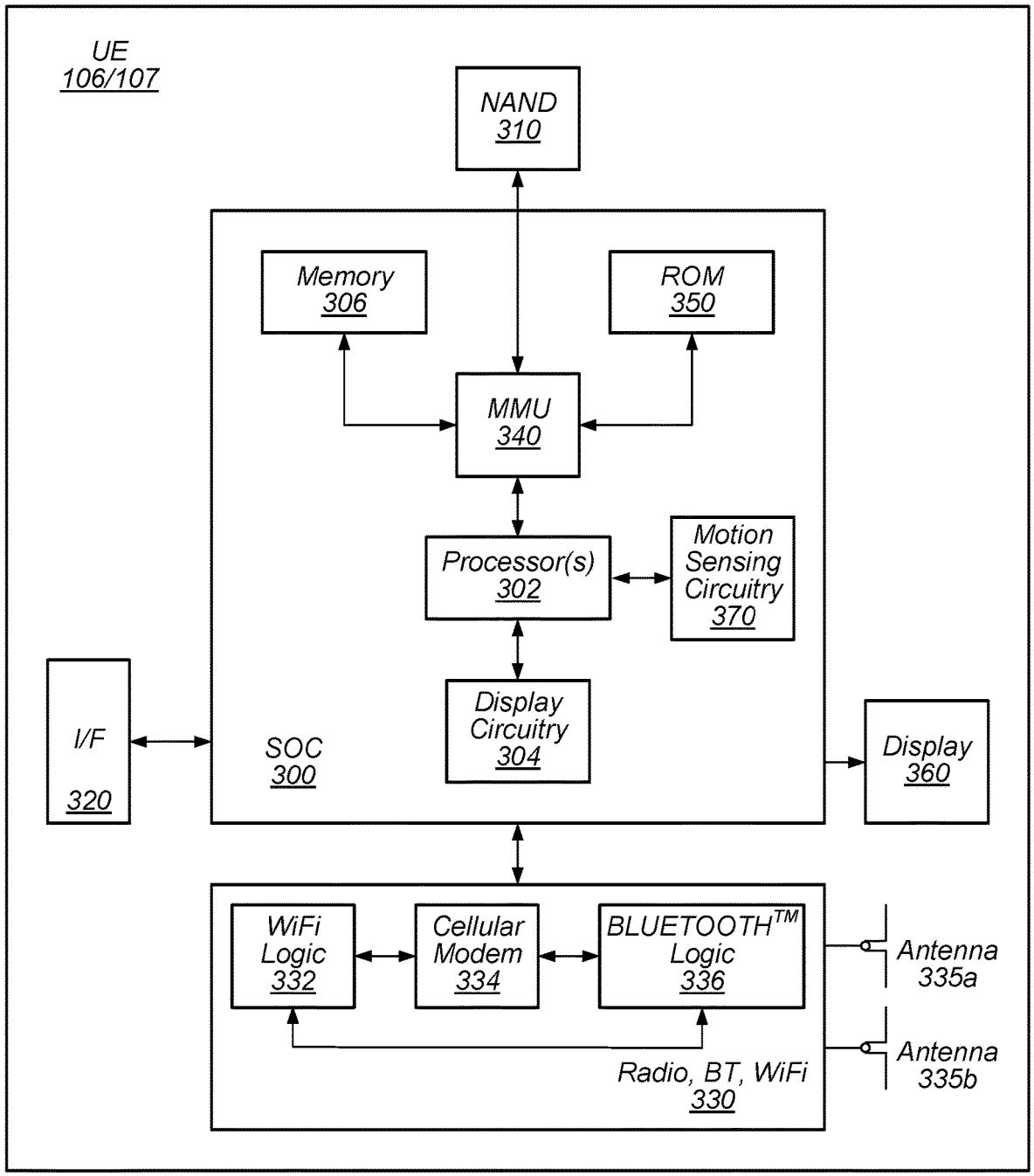
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., Wi-Fi logic 332, cellular modem 334, BT logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
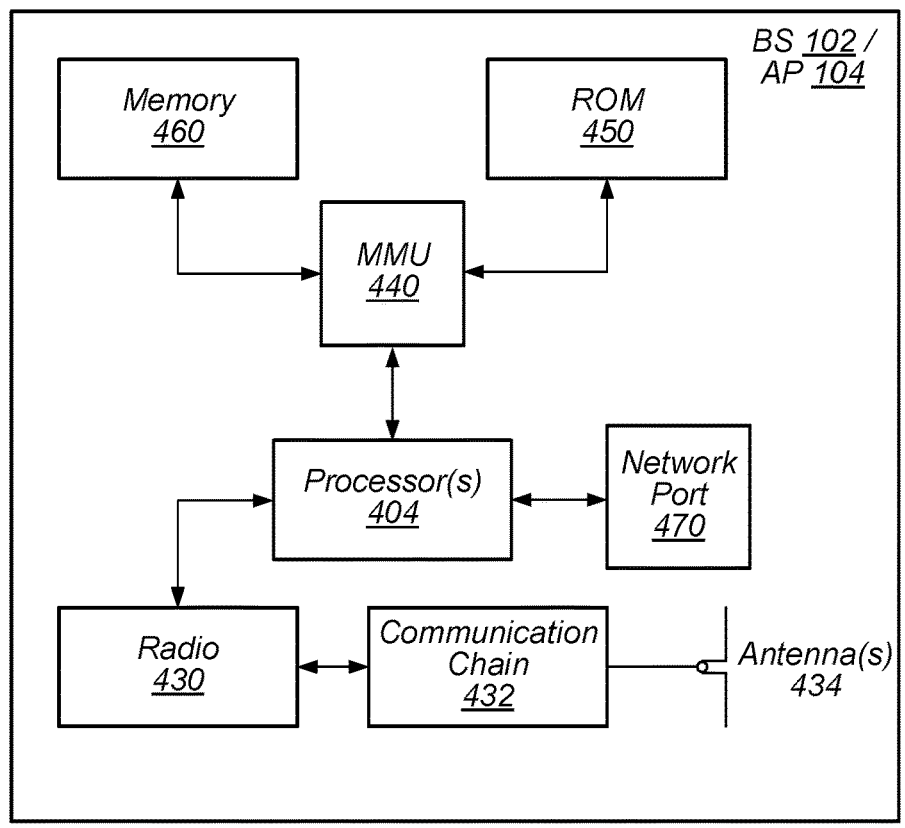
FIG. 4 is a block diagram illustrating an example base station, according to some embodiments.

FIG. 4—Block Diagram of a Base Station

FIG. 4 illustrates an example block diagram of a base station 102 or access point 104, according to some embodiments. It is noted that the base station of FIG. 4 is merely one example of a possible base station. As shown, the base station 102/access point 104 may include processor(s) 404 which may execute program instructions for the base station 102/access point 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102/access point 104 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102/access point 104 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102/access point 104 may be configured to communicate wirelessly using multiple wireless communication standards. In some instances, the base station 102 may include multiple radios, which may enable the base station 102 to communicate according to multiple wireless communication technologies. For example, as one possibility, the base station 102/access point 104 may include an LTE radio for performing communication according to LTE as well as a Wi-Fi radio for performing communication according to Wi-Fi. In such a case, the base station 102/access point 104 may be capable of operating as both an LTE base station and a Wi-Fi access point. As another possibility, the base station 102/access point 104 may include a multi-mode radio which is capable of performing communications according to any of multiple wireless communication technologies (e.g., LTE and Wi-Fi, LTE and UMTS, LTE and CDMA2000, UMTS and GSM, etc.). As still another possibilty, the base station 102/access point 104 may be configured to act exclusively as a Wi-Fi access point, e.g., without cellular communication capability.

As described further subsequently herein, the BS 102/AP 104 may include hardware and software components for implementing or supporting implementation of features described herein. The processor 404 of the base station 102/access point 104 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102/AP 104, in conjunction with one or more of the other components 430, 432, 434, 440, 450, 460, 470 may be configured to implement or support implementation of part or all of the features described herein.

Figure 5:
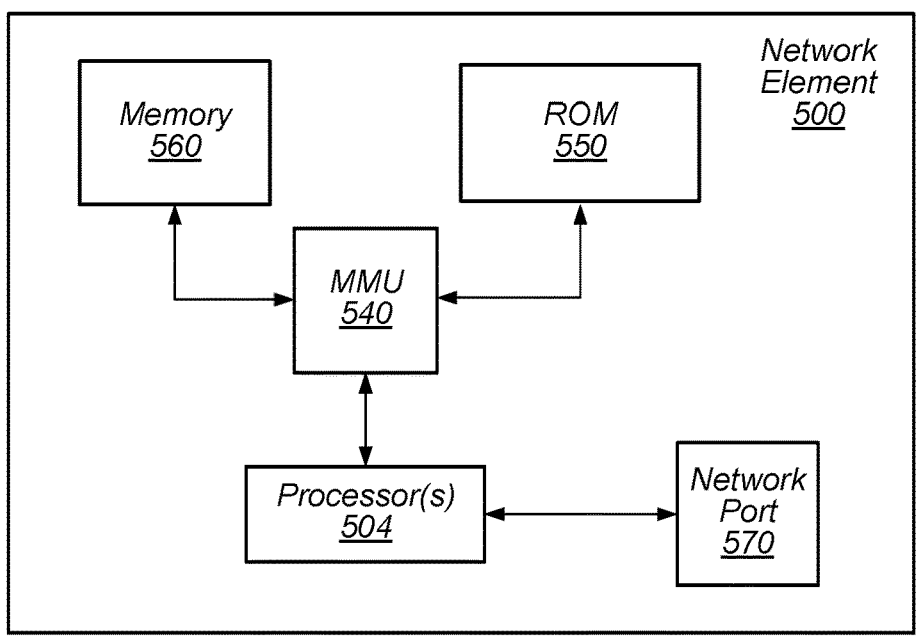
FIG. 5 is a block diagram illustrating an example cellular network element, according to some embodiments.

FIG. 5—Exemplary Block Diagram of a Network Element

FIG. 5 illustrates an exemplary block diagram of a network element 500, according to some embodiments. According to some embodiments, the network element 500 may implement one or more logical functions/entities of a cellular core network, such as an access and mobility management function (AMF) or mobility management entity (MME), a short message service function (SMSF), a session management function (SMF), a serving gateway (S-GW), a network slice selection function (NSSF) entity, etc. It is noted that the network element 500 of FIG. 5 is merely one example of a possible network element 500. As shown, the core network element 500 may include processor(s) 504 which may execute program instructions for the core network element 500. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The network element 500 may include at least one network port 570. The network port 570 may be configured to couple to one or more base stations and/or other cellular network entities and/or devices. The network element 500 may communicate with base stations (e.g., eNBs) and/or other network entities/devices by means of any of various communication protocols and/or interfaces.

As described further subsequently herein, the network element 500 may include hardware and software components for implementing and/or supporting implementation of features described herein. The processor(s) 504 of the core network element 500 may be configured to implement or support implementation of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

FIG. 6—Flowchart

Figure 6:
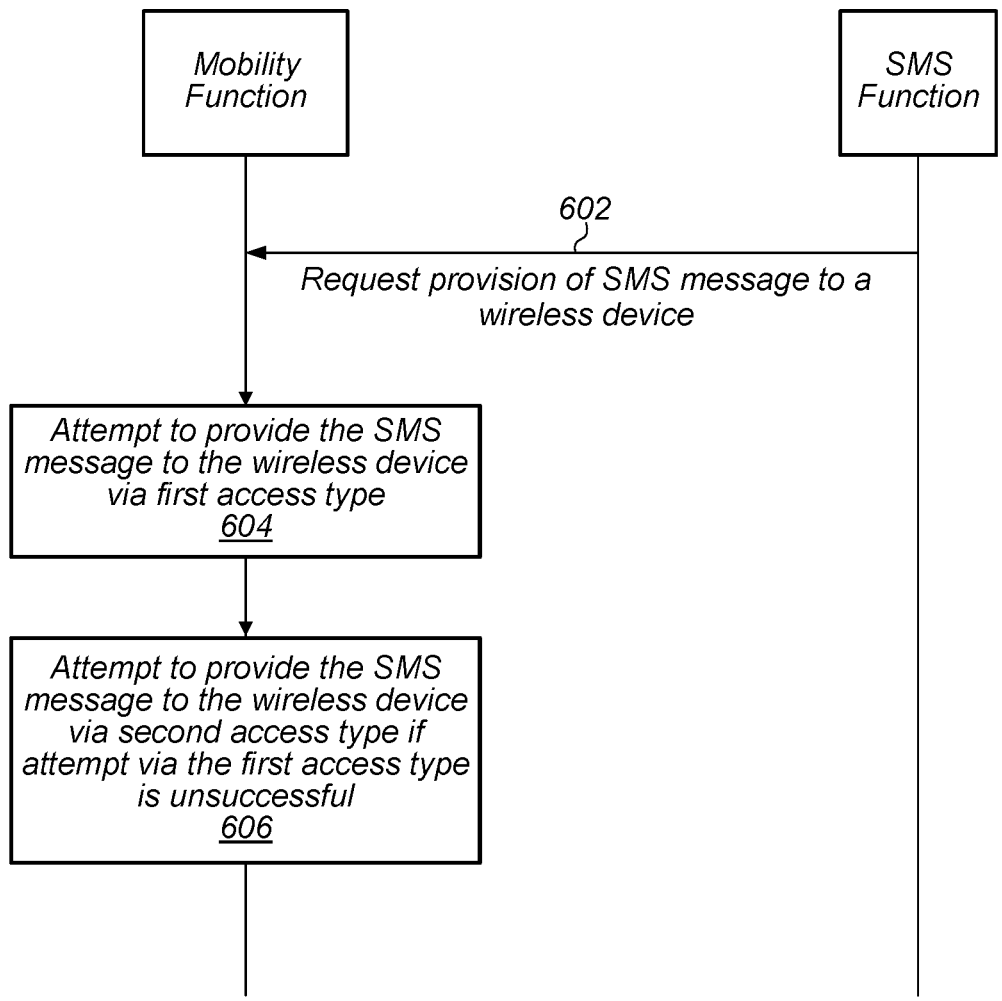
FIG. 6 is a communication flow diagram illustrating an exemplary method for managing short message service re-transmissions for wireless devices, according to some embodiments.

FIG. 6 is a flowchart diagram illustrating a method for managing mobile terminating short message service re-transmissions for wireless devices, according to some embodiments. Aspects of the method of FIG. 6 may be implemented by cellular network elements such as an access and mobility function (AMF), a short message service function (SMSF), and/or a cellular base station; by a wireless device (such as a UE 106 and/or an accessory device 107); and/or more generally in conjunction with any of the computer systems or devices shown in the above Figures, among other devices, as desired.

In various embodiments, some of the elements of the methods shown may be performed concurrently, in a different order than shown, may be substituted for by other method elements, or may be omitted. Additional method elements may also be performed as desired. As shown, the method may operate as follows.

In 602, a SMSF of a cellular network may request that a mobility function (such as a MME or a AMF) of the cellular network provide a mobile-terminating short message service (SMS) message to a wireless device. The mobility function may receive the request and may attempt to provide the SMS message to the wireless device.

The wireless device may be registered with the cellular network (and potentially specifically with the mobility function) via multiple access types, which may include cellular (e.g., 3GPP, such as LTE or 5G NR) and non-cellular (or at least non-3GPP, such as Wi-Fi) access types, at least according to some embodiments. For example, the wireless device may be registered with the mobility function via a 5G NR gNB, by way of which the wireless device may be capable of obtaining access to the 5G core network (CN), and may also be registered with the mobility function via a Wi-Fi access point and a non-3GPP interworking function (N3IWF), by way of which the wireless device may be capable of obtaining access to the 5G CN.

In 604, the mobility function may attempt to provide the mobile-terminating SMS message to the wireless device via a first access type. The mobility function may determine to utilize the first access type based on any of various possible considerations. As one possibility, the request received from the SMSF may indicate to the mobility function to attempt to provide the SMS message via the first access type. In such a case, the mobility function may attempt to provide the SMS message to the wireless device via a first access type based at least in part on such an indication. As another possibility, the request received from the SMSF may not specify an access type to use to provide the SMS message, and the mobility function may instead determine based at least in part on any of various local policy considerations (e.g., relative priority of various possible access types, current connection quality via various possible access types, etc.) to utilize the first access type. A combination of multiple such considerations, and/or any of various other possible considerations, may also or alternatively be used in determining to attempt to provide the SMS message to the wireless device via the first access type.

In 606, the mobility function may attempt to provide the mobile-terminating SMS message to the wireless device via a second access type, e.g., if attempting to provide the SMS message to the wireless device via the first access type is unsuccessful. Such a re-try may be prompted by the SMSF or autonomously performed by the mobility function, according to various embodiments.

For example, according to one possible framework, the SMSF may be responsible for both selecting the access type used and for prompting re-transmission attempts for mobile terminating SMS messages. According to such a framework, the request to provide the SMS message to the wireless device may include an indication to provide the SMS message to the wireless device via the first access type. After determining that the attempt to provide the SMS message to the wireless device via the first access type is unsuccessful, the mobility function may provide a response to the SMSF, indicating that an unsuccessful attempt to provide the SMS message to the wireless device via the first access type was performed.

In such a scenario, the SMSF may in turn provide a request to the mobility function to provide the SMS message to the wireless device via the second access type, e.g., based on receiving the indication that attempting to provide the SMS message to the wireless device via the first access type was unsuccessful, and potentially further based on knowledge that the wireless device is also registered with the mobility function via the second access type. The attempt by the mobility function to provide the SMS message to the wireless device via the second access type may thus be based at least in part on receiving the request to provide the SMS message to the wireless device via the second access type.

According to another possible framework, the mobility function may be responsible for selecting the access type used and the SMSF may be responsible for prompting re-transmission attempts for SMS messages. According to such a framework, the request to provide the mobile-terminating SMS message to the wireless device may not include any indication of an access type to use to provide the SMS message to the wireless device, and the mobility function may determine on its own which access type to use for each of the initial attempt and the re-try attempt. After determining that the attempt to provide the SMS message to the wireless device via the first access type is unsuccessful, the mobility function may provide a response to the SMSF, indicating that an unsuccessful attempt to provide the SMS message to the wireless device was performed. The response may indicate that the unsuccessful attempt was performed via the first access type, or may not indicate an access type that was used in the unsuccessful attempt (for example, an indication of a temporary failure to deliver the SMS message to the wireless device may be provided).

In such a framework, the mobility function may store information indicating that an unsuccessful attempt to provide the SMS message to the wireless device via the first access type was performed if attempting to provide the SMS message to the wireless device via the first access type is unsuccessful. The attempt by the mobility function to provide the SMS message to the wireless device via the second access type may thus be based at least in part on the stored information indicating that an unsuccessful attempt to provide the SMS message to the wireless device via the first access type was performed.

As still another possible framework, the mobility function may be responsible for selecting the access type used and for performing re-transmission attempts for mobile-terminating SMS messages. According to such a framework, the request to provide the SMS message to the wireless device may not include any indication of an access type to use to provide the SMS message to the wireless device, and the mobility function may determine on its own which access type to use for each of the initial attempt and the re-try attempt(s), e.g., similar to the previously described framework in which the mobility function is responsible for selecting the access type used and the SMSF is responsible for prompting re-transmission attempts for SMS messages. However, in such a framework, the mobility function may proceed to the attempt to provide the SMS message to the wireless device via the second access type without immediately providing a response to the SMSF and without receiving a request to re-try providing the SMS message to the wireless device from the SMSF. In other words, the mobility function may perform multiple attempts to deliver the SMS message to the wireless device without providing a response to the SMSF between the delivery attempts. The mobility function may perform any number of re-transmissions, using any of various available access types, e.g., using its own local policy to determine which access type to attempt to use for each delivery attempt.

The mobility function may also store information indicating that an unsuccessful attempt to provide the SMS message to the wireless device via the first access type was performed if attempting to provide the SMS message to the wireless device via the first access type is unsuccessful in such a framework. Such information may generally be used by the mobility function as part of its re-transmission logic. For example, the attempt by the mobility function to provide the SMS message to the wireless device via the second access type may thus be based at least in part on the stored information indicating that an unsuccessful attempt to provide the SMS message to the wireless device via the first access type was performed.

The mobility function may provide a response to the request to provide the SMS message indicating whether delivery of the SMS message was successful after exhausting any re-transmission attempts performed by the mobility function. Thus, a response indicating that delivery of the SMS message failed might be provided once attempting to provide the SMS message to the wireless device via the first access type is unsuccessful and attempting to provide the SMS message to the wireless device via the second access type is also unsuccessful (or possibly more generally if attempts to provide the SMS message via each possible access type are unsuccessful), in such a framework, at least according to some embodiments.

Note that each attempt to provide the SMS message to the wireless device may include multiple communication steps, at least according to some embodiments. For example, the SMSF may initially provide a wireless device reachability request to the mobility function, based on which the mobility function may attempt to confirm reachability of the wireless device via a selected access type. Upon confirming reachability in accordance with the reachability request, the SMSF may provide the SMS message to the mobility function to be provided to the wireless device. The mobility function may then attempt to deliver the SMS message via the selected access type, and may report on whether the SMS message was successfully delivered. In such a case, there may be various possibilities for when access type indications are provided between the mobility function and the SMSF, if applicable. For example, as one possibility, the SMSF may provide an access type indication with the reachability request, the mobility function may provide an access type indication with the reachability response, the SMSF may provide an access type indication with the SMS message, and the mobility function may respond with access type indication with the report on whether the SMS message was successfully delivered. As another possibility, it may be possible to include an access type indication with only a subset of such communications, such as with the initial reachability request and with the report on whether the SMS message was successfully delivered. As still another possibility (e.g., in case the responsibility for determining which access type to use to attempt to provide the SMS message lies with the mobility function), it may be possible that no such communications between the mobility function and the SMS function include an access type indication.

FIGS. 7-13 and Additional Information

FIGS. 7-13 and the following additional information are provided as being illustrative of further considerations and possible implementation details relating to the method of FIG. 6, and are not intended to be limiting to the disclosure as a whole. Numerous variations and alternatives to the details provided herein below are possible and should be considered within the scope of the disclosure.

Figure 7:
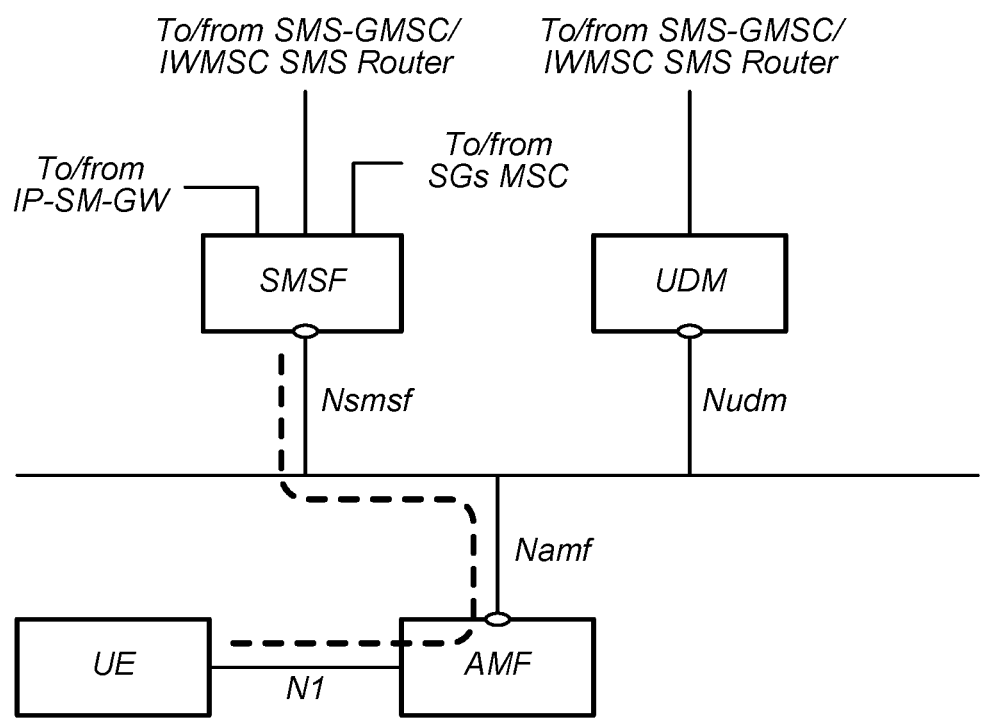
FIG. 7 illustrates an example portion of a cellular network in which short message service re-transmission management may be implemented, according to some embodiments.

According to some embodiments, 3GPP 5G NR cellular communication may include the possibility of providing SMS over non-access stratum (NAS). FIG. 7 illustrates an example portion of a cellular network in which such SMS over NAS communication may be performed. As shown, a SMSF may communicate with an AMF (e.g., using Nsmsf and Namf interfaces), and the AMF may communicate with a UE (e.g., using an N1 interface). The UE may be registered with the network via either or both of 3GPP access and non-3GPP access.

In such a scenario, it may be useful to provide a framework specifying which entity is responsible for initiating mobile terminating SMS delivery re-transmissions, e.g., in case the UE is configured to receive SMS messages via both such access types, and the 3GPP and non-3GPP accesses are served by the same AMF (e.g., the non-3GPP access via N3IWF is in the same PLMN as the 3GPP access). For example, in the absence of such a framework, it may be possible that a SMS message goes undelivered even while no attempt is made to provide the SMS message via one or more access types for which a UE is registered.

Figure 8:
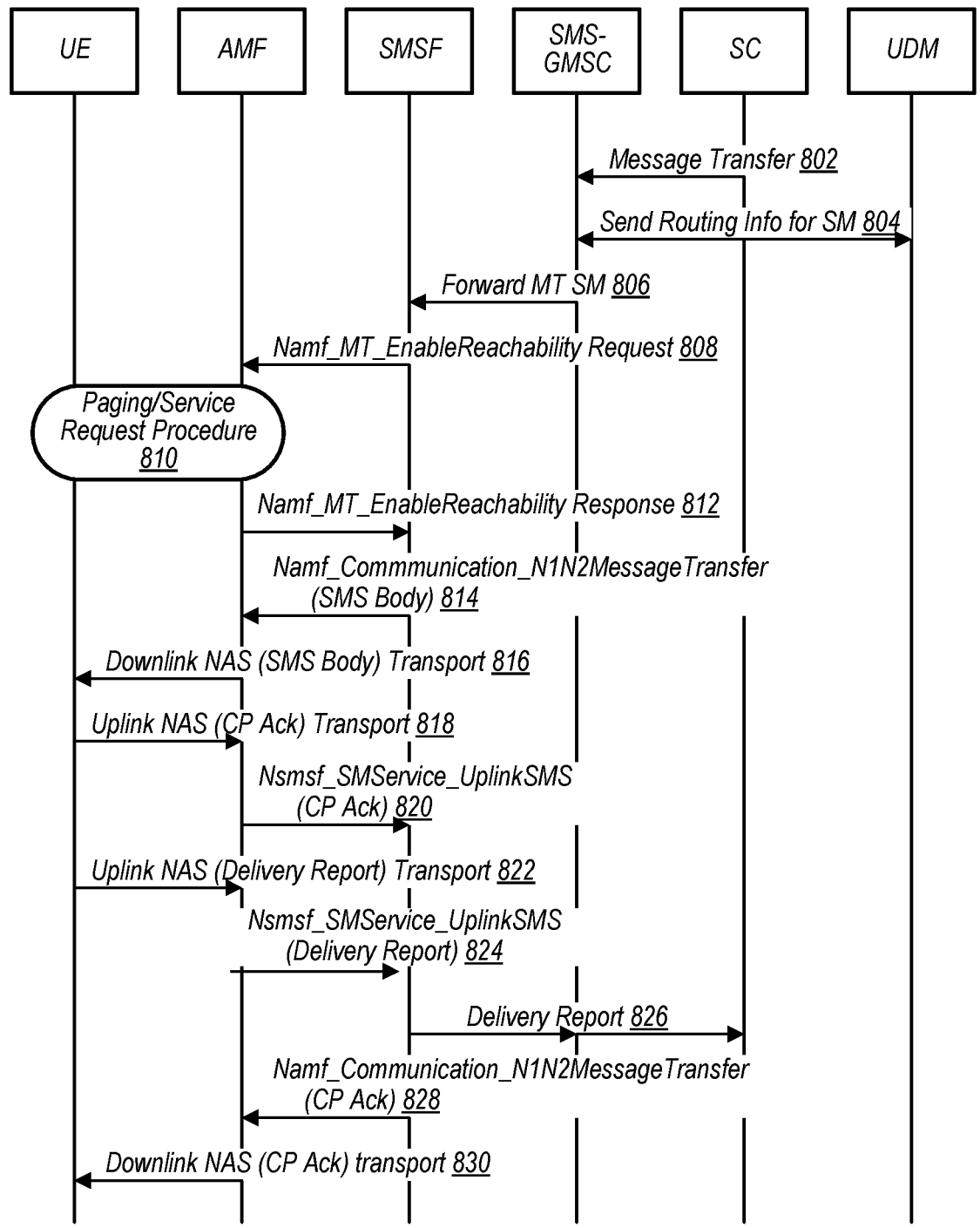
FIG. 8 is a communication flow diagram illustrating example mobile terminated short message service over non-access stratum communications, according to some embodiments.

FIG. 8 is a communication flow diagram illustrating example mobile terminated short message service over non-access stratum communications, according to some embodiments.

As shown, a SMS service center (SC) may initiate a message transfer (802), and a user data management (UDM) entity may send routing info for the short message (SM) (804), to a short message service gateway mobile services switching center (SMS-GMSC). The SMS-GMSC may forward the mobile terminated/mobile terminating (MT) SM to the SMSF (806). The SMSF may provide a Namf_MT_EnableReachability Request to the AMF (808). The AMF may perform a paging/service request procedure, e.g., to attempt to reach the UE (810), and may provide a Namf_MT_EnableReachability Response to the SMSF (812). The SMSF may proceed to send a Namf_Communication_N1N2MessageTransfer (e.g., including the SMS body) to the AMF (814), e.g., assuming the paging/service request procedure resulted in successfully reaching the UE. The AMF may provide downlink NAS (SMS body) transport to the UE (816), and the UE may provide uplink NAS (control protocol acknowledgement (CP Ack)) transport to the AMF (818). The AMF may send a Nsmsf_SMService_UplinkSMS (CP Ack) message to the SMSF (820). The UE may further provide uplink NAS (delivery report) transport to the AMF (822), and the AMF may further send a Nsmsf_SMService_UplinkSMS (delivery report) message to the SMSF (824). The SMSF may provide a delivery report to the SC via the SMS-GMSC (826), and may provide a Namf_Communication_N1N2MessageTransfer (CP ACK) message to the AMF (828), which may provide downlink NAS (CP Ack) transport to the UE (830).

At least according to some embodiments, at least some such AMF Namf_services may be further described in 3GPP specification documents. For example, 3GPP TS 23.502 may include further description of Namf_MT_EnableUEReachability service operation in clause 5.2.2.4.2, and may include further description of Namf_Communication_N1N2MessageTransfer service operation in clause 5.2.2.2.7.

FIGS. 9-13 are communication flow diagrams illustrating further exemplary methods for managing short message service re-transmissions for wireless devices, according to some embodiments. In particular, FIGS. 9-10 may be illustrative of message flows that could occur in a framework in which the SMSF is responsible for selecting the access network type and prompting re-transmissions on failure indications from the AMF for SMS over NAS communications, FIGS. 11-12 may be illustrative of message flows that could occur in a framework in which the AMF is responsible for selecting the access network type and the SMSF is responsible for prompting re-transmissions on failure indications from the AMF for SMS over NAS communications, and FIG. 13 may be illustrative of message flows that could occur in a framework in which the AMF is responsible for selecting the access network type and initiating re-transmissions for SMS over NAS communications.

Figure 9:
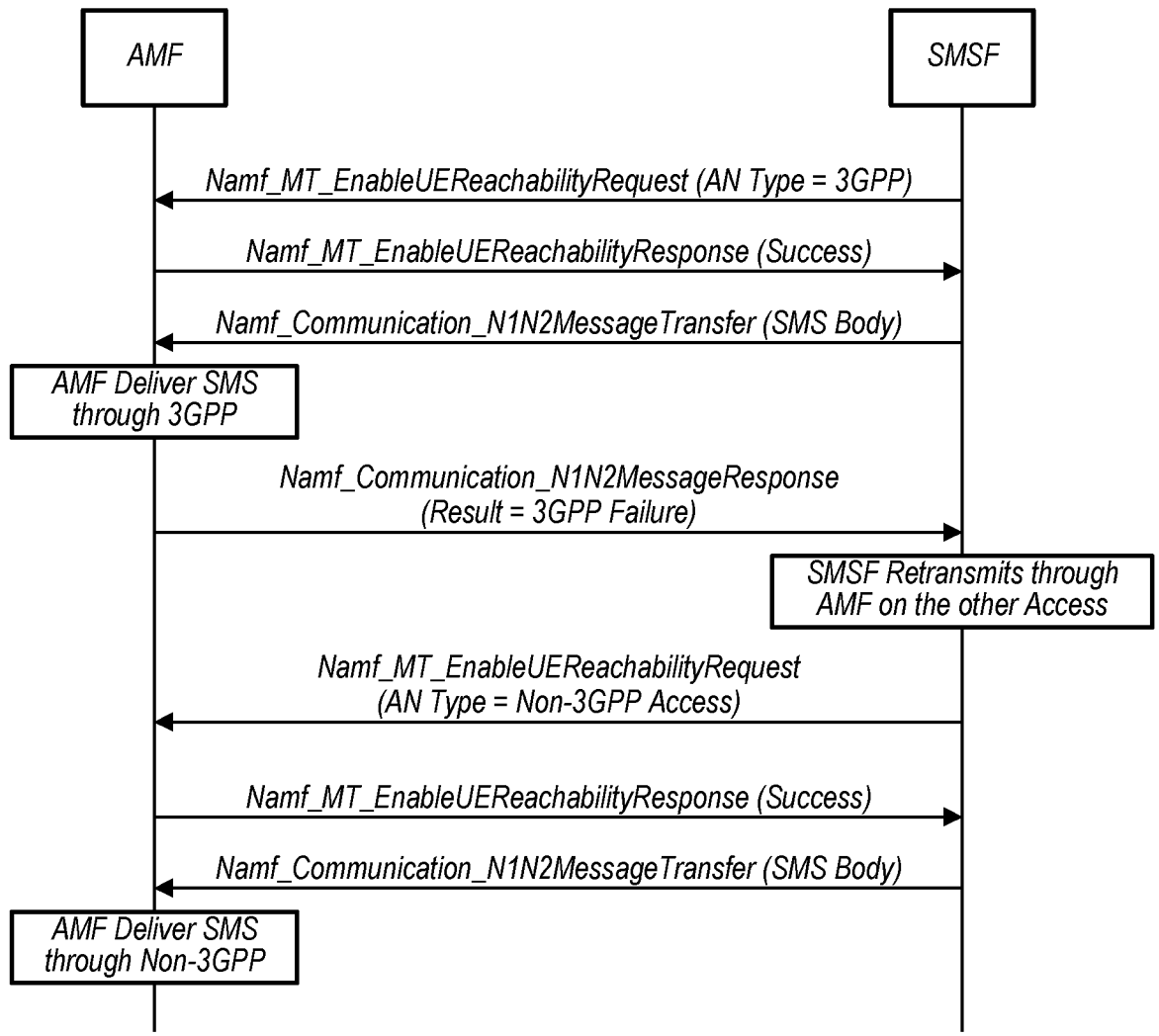
FIGS. 9-13 are communication flow diagrams illustrating further exemplary methods for managing short message service re-transmissions for wireless devices, according to some embodiments.

In FIG. 9, the SMSF may include an access network type (AN type) in the Namf_MT_EnableUEReachability request (902), which may specify the access type (e.g, 3GPP or non-3GPP). The AMF may memorize (e.g., store information indicating) the access type specified by the SMSF, and use that specified access type to deliver the SMS message in the follow up Namf_Communication_N1N2MessageTransfer messages from the corresponding SMSF. Upon delivery failure in one access type, the AMF may inform the SMSF in the Namf_Communication_N1N2MessageTransfer response with a result indicating which access type has failed. As shown, the SMSF may re-attempt the SMS delivery in such a case through the same AMF by invoking the Namf_MT_EnableUEReachability request service operation with AN type set to the other access (3GPP or non-3GPP).

Figure 10:
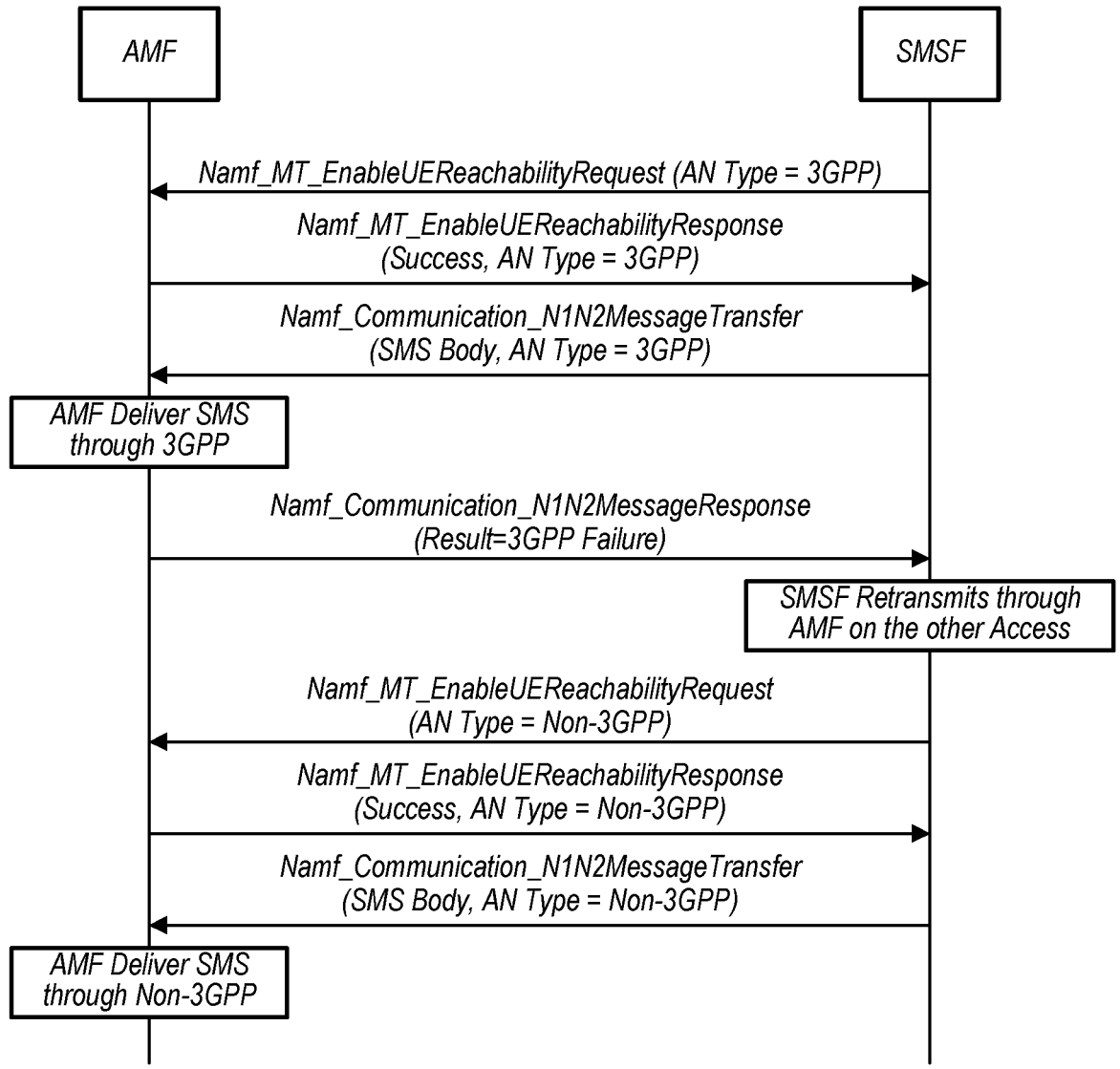

In FIG. 10, the SMSF may similarly include an access network type (AN type) in the Namf_MT_EnableUEReachability request, which may specify the access type (e.g, 3GPP or non-3GPP). The AMF may return a Namf_MT_EnableUEReachability response with an indication of the AN type used. The SMSF may specify the same AN type in the follow up Namf_Communication_N1N2MessageTransfer messages sent to the AMF. The AMF may thus attempt to deliver the SMS through the AN type it has indicated. Upon delivery failure in one access type, the AMF may inform the SMSF in the Namf_Communication_N1N2MessageTransfer response with a result indicating which access type has failed. As shown, the SMSF may re-attempt the SMS delivery in such a case through the same AMF by invoking the Namf_MT_EnableUEReachability request service operation with AN type set to the other access (3GPP or non-3GPP).

Figure 11:
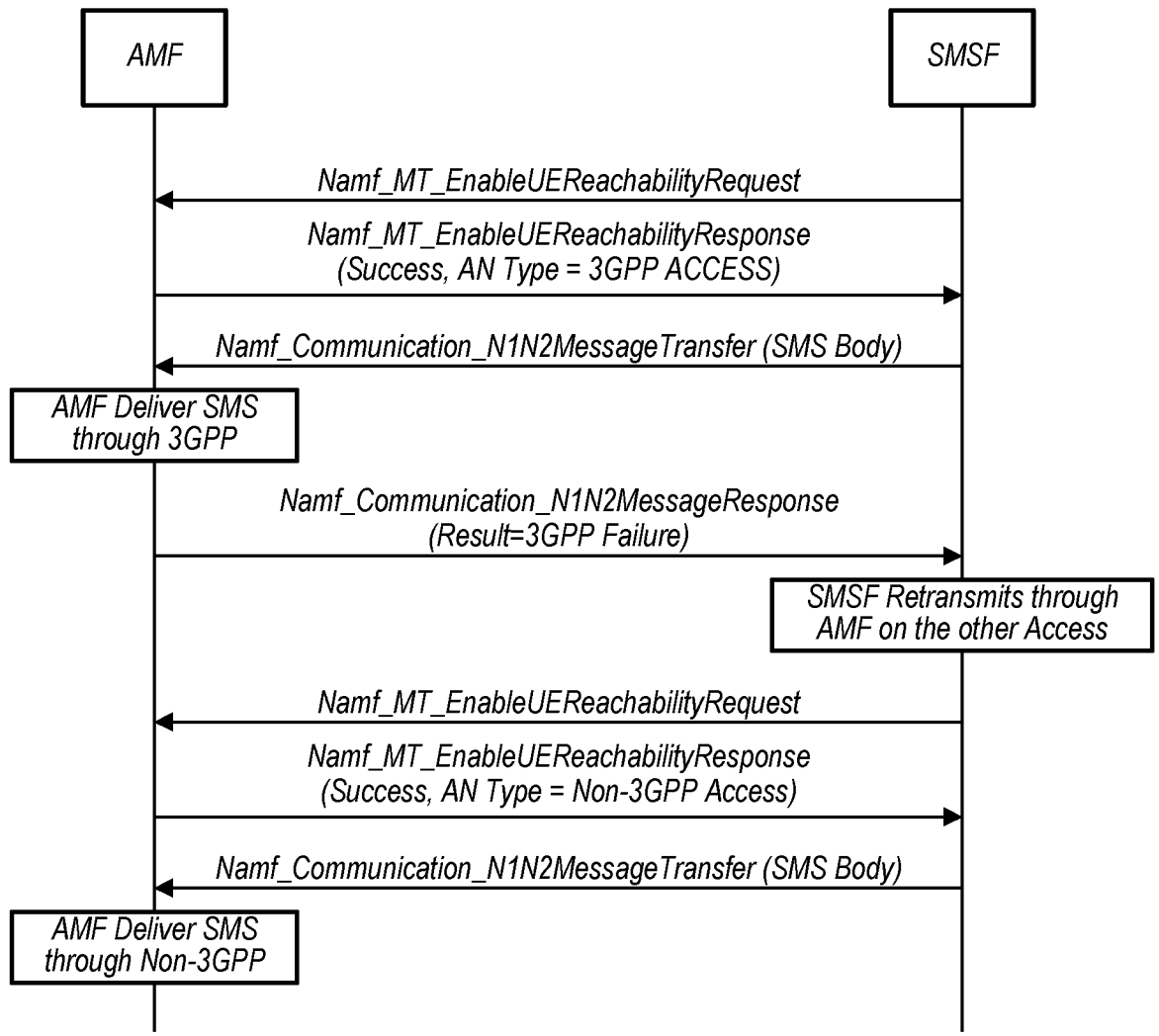

In FIG. 11, the SMSF does not need to specify the access type in the Namf_MT_EnableUEReachability request. The AMF may include an access network type (AN type) in the Namf_MT_EnableUEReachability response, which may specify the access type (3GPP or non-3GPP) that the AMF has chosen to use to attempt to deliver the SMS. The SMSF may send the Namf_Communication_N1N2MessageTransfer request (in which it may also not be necessary to specify the access type) to the AMF for the SMS delivery. The AMF may use the AN type that it has indicated in the Namf_MT_EnableUEReachability response to attempt to deliver the SMS to the UE.

Upon delivery failure in one access type, the AMF may inform the SMSF in the Namf_Communication_N1N2MessageTransfer response with a result indicating which access type has failed. The AMF may also remember (e.g., store information indicating) which access type has failed, and may select another access type for subsequent attempts requested by the SMSF based on such memory. As shown, the SMSF may re-attempt the SMS delivery in such a case through the same AMF by invoking the Namf_MT_EnableUEReachability request service operation and the AMF may respond by choosing the other AN type (3GPP or non-3GPP).

Figure 12:
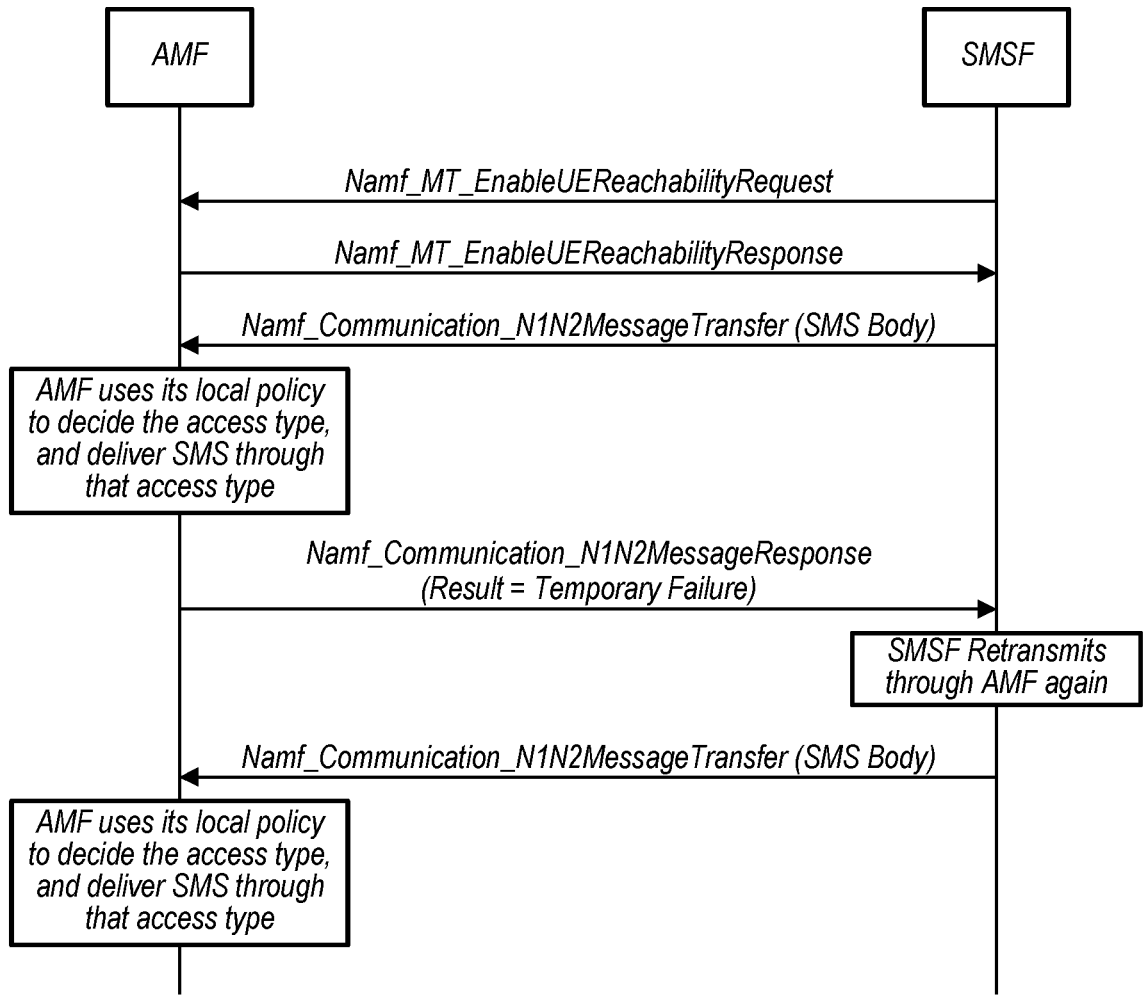

In FIG. 12, the SMSF similarly does not need to specify the access type in the Namf_MT_EnableUEReachability request. The AMF may use its local policy to decide which access type (3GPP or non-3GPP) to use to attempt to deliver the SMS. The SMSF may send the Namf_Communication_N1N2MessageTransfer request (in which it may also not be necessary to specify the access type) to the AMF for the SMS delivery. Upon delivery failure in one access type, the AMF may inform the SMSF in the Namf_Communication_N1N2MessageTransfer response with a result indicating Temporary Failure. The AMF may remember (e.g., store information indicating) which access type has failed, and may select another access type for subsequent attempts requested by the SMSF based on such memory. As shown, the SMSF may re-attempt the SMS delivery in such a case through the same AMF by invoking the Namf_MT_EnableUEReachability request service operation (without specifying the access type) and the AMF may again use its local policy to decide which access type (3GPP or non-3GPP) to use to attempt to deliver the SMS (e.g., potentially choosing an AN type that was not previously used).

Figure 13:
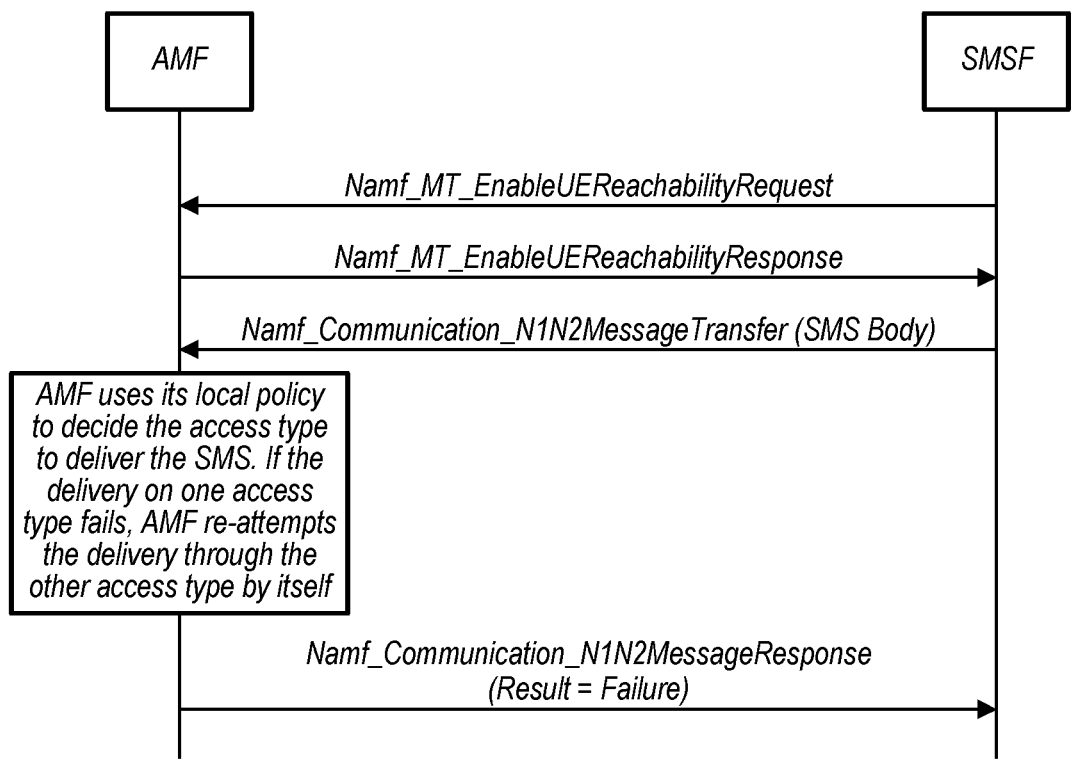

In FIG. 13, the SMSF similarly does not need to specify the access type in the Namf_MT_EnableUEReachability request. The AMF may use its local policy to decide which access type (3GPP or non-3GPP) to use to attempt to deliver the SMS. The SMSF may send the Namf_Communication_N1N2MessageTransfer request (in which it may also not be necessary to specify the access type) to the AMF for the SMS delivery. Upon delivery failure in one access type, the AMF may not inform the SMSF immediately. Instead, the AMF may re-attempt the delivery by itself. The AMF may only inform the SMSF of SMS delivery failure (in the Namf_Communication_N1N2MessageTransfer response) after it has exhausted the delivery options (e.g., on both 3GPP and non-3GPP access types). Note that it may be useful to increase the TC1* timer in the SMSF SM-CP protocol (e.g., in 3GPP TS 24.011) to account for the AMF's potential retransmissions, if the framework of FIG. 13 is used, at least according to some embodiments.

In the following further exemplary embodiments are provided.

One set of embodiments may include a method, comprising: by a cellular network entity of a cellular network: receiving a request to provide a short message service (SMS) message to a wireless device, wherein the wireless device is registered with the cellular network entity via at least two access types; attempting to provide the SMS message to the wireless device via a first access type of the at least two access types; and attempting to provide the SMS message to the wireless device via a second access type of the at least two access types if attempting to provide the SMS message to the wireless device via the first access type is unsuccessful.

According to some embodiments, the request to provide the SMS message to the wireless device further comprises an indication to provide the SMS message to the wireless device via the first access type, wherein the method further comprises: providing a response to the request to provide the SMS message indicating that attempting to provide the SMS message to the wireless device via the first access type is unsuccessful; and receiving a request to provide the SMS message to the wireless device via the second access type, wherein attempting to provide the SMS message to the wireless device via a second access type of the at least two access types if attempting to provide the SMS message to the wireless device via the first access type is unsuccessful is further based at least in part on receiving the request to provide the SMS message to the wireless device via the second access type.

According to some embodiments, the method further comprises: providing a response to the request to provide the SMS message indicating that an unsuccessful attempt to provide the SMS message to the wireless device was performed if attempting to provide the SMS message to the wireless device via the first access type is unsuccessful; and receiving a request to re-try providing the SMS message to the wireless device, wherein attempting to provide the SMS message to the wireless device via a second access type of the at least two access types if attempting to provide the SMS message to the wireless device via the first access type is unsuccessful is further based at least in part on receiving the request to re-try providing the SMS message to the wireless device.

According to some embodiments, the response further indicates that the unsuccessful attempt to provide the SMS message to the wireless device was performed via the first access type.

According to some embodiments, the response further indicates that the unsuccessful attempt comprises a temporary failure to deliver the SMS message to the wireless device.

According to some embodiments, the method further comprises: storing information indicating that an unsuccessful attempt to provide the SMS message to the wireless device via the first access type was performed if attempting to provide the SMS message to the wireless device via the first access type is unsuccessful, wherein attempting to provide the SMS message to the wireless device via a second access type of the at least two access types if attempting to provide the SMS message to the wireless device via the first access type is unsuccessful is further based at least in part on the stored information indicating that an unsuccessful attempt to provide the SMS message to the wireless device via the first access type was performed.

According to some embodiments, the method further comprises: providing an response to the request to provide the SMS message indicating that delivery of the SMS message failed if attempting to provide the SMS message to the wireless device via the first access type is unsuccessful and attempting to provide the SMS message to the wireless device via the second access type is also unsuccessful.

According to some embodiments, the request to provide the SMS message is received from a SMS function (SMSF) of the cellular network.

According to some embodiments, the cellular network entity comprises an access and mobility management function (AMF).

Another set of embodiments may include a method, comprising: by a short message service function (SMSF) of a cellular network: providing a request to provide a short message service (SMS) message to a wireless device, wherein the request to provide the SMS message is provided to an access and mobility management function (AMF) of the cellular network, wherein the wireless device is registered with the cellular network via at least two access types; receiving a response to the request to provide the SMS message indicating that an unsuccessful attempt to provide the SMS message to the wireless device was performed; and providing a request to re-try providing the SMS message to the wireless device to the second cellular network entity of the cellular network, wherein the request to re-try providing the SMS message is provided to an access and mobility management function (AMF) of the cellular network.

According to some embodiments, the request to provide the SMS message further comprises an indication to attempt to provide the SMS message to the wireless device via a first access type, wherein the request to re-try providing the SMS message further comprises an indication to attempt to provide the SMS message to the wireless device via a second access type.

According to some embodiments, the at least two access types comprise a 3GPP access type and a non-3GPP access type.

Still another exemplary embodiment may include a method, comprising: by a device: performing any or all parts of the preceding examples.

A further exemplary embodiment may include a device, comprising: an antenna; a radio coupled to the antenna; and a processing element operably coupled to the radio, wherein the device is configured to implement any or all parts of the preceding examples.

Another exemplary embodiment may include an apparatus, comprising a processor configured to implement any or all parts of the preceding examples.

Yet another exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

A yet further exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause an access and mobility function (AMF) entity of a cellular network to:
receive, from a short message service (SMS) function (SMSF), a request to provide a mobile terminating SMS message to a wireless device, wherein the wireless device is registered with the AMF entity via a plurality of access types;
perform a first attempt to provide the SMS message to the wireless device, wherein the first attempt is performed via a first access type;
determine that the first attempt to provide the SMS message to the wireless device is unsuccessful; and
perform a second attempt to provide the SMS message to the wireless device, wherein the second attempt is performed via a second access type.

2. The apparatus of claim 1, wherein the processor is further configured to cause the AMF entity to:

determine to perform the second attempt to provide the SMS message via the second access type based at least in part on the first attempt to provide the SMS message to the wireless device being unsuccessful.

3. The apparatus of claim 1, wherein the processor is further configured to cause the AMF entity to:
store information indicating that an unsuccessful attempt to provide the SMS message to the wireless device via the first access type was performed based at least in part on determining that the first attempt to provide the SMS message to the wireless device is unsuccessful,
wherein the second attempt to provide the SMS message to the wireless device is performed via the second access type further based at least in part on the stored information indicating that the unsuccessful attempt to provide the SMS message to the wireless device via the first access type was performed.

4. The apparatus of claim 1, wherein the processor is further configured to cause the AMF entity to:
perform the first attempt to provide the SMS message to the wireless device and the second attempt to provide the SMS message to the wireless device without providing a response to the request to provide the SMS message to the wireless device between the first attempt and the second attempt.

5. The apparatus of claim 1, wherein the processor is further configured to cause the AMF entity to:
determine that the second attempt to provide the SMS message to the wireless device is unsuccessful;
determine that delivery of the SMS message failed based at least in part on both the first attempt to provide the SMS message to the wireless device being unsuccessful and the second attempt to provide the SMS message to the wireless device being unsuccessful; and
provide a response to the request to provide the SMS message indicating that delivery of the SMS message failed.

6. The apparatus of claim 5, wherein the processor is further configured to cause the AMF entity to:
determine that delivery of the SMS message failed if attempts to provide the SMS message to the wireless device via each of the plurality of access types are unsuccessful.

7. The apparatus of claim 1,
wherein the plurality of access types comprise at least a 3GPP access type and a non-3GPP access type.

8. The apparatus of claim 1, wherein the processor is further configured to cause the AMF entity to:
determine that the second attempt to provide the SMS message to the wireless device is unsuccessful;
determine that delivery of the SMS message failed if attempts to provide the SMS message to the wireless device via the first and second access types are unsuccessful; and
provide, to the SMSF, a response to the request to provide the SMS message indicating that delivery of the SMS message failed.

9. A cellular network entity of a cellular network, comprising:
a network interface; and
a processing element coupled to the network interface;
wherein the cellular network entity is configured to:
receive, at an access and mobility management function (AMF), a request to provide a short message service (SMS) message to a wireless device from an SMS function (SMSF), wherein the wireless device is registered with the cellular network entity via at least two access types;
attempt, by the AMF, to provide the SMS message to the wireless device via a first access type of the at least two access types; and
attempt, by the AMF, to provide the SMS message to the wireless device via a second access type of the at least two access types if attempting to provide the SMS message to the wireless device via the first access type is unsuccessful.

10. The cellular network entity of claim 9, wherein the request to provide the SMS message to the wireless device further comprises an indication to provide the SMS message to the wireless device via the first access type, wherein the cellular network entity is further configured to:
provide a response to the request to provide the SMS message indicating that attempting to provide the SMS message to the wireless device via the first access type is unsuccessful; and
receive a request to provide the SMS message to the wireless device via the second access type,
wherein attempting to provide the SMS message to the wireless device via the second access type of the at least two access types if attempting to provide the SMS message to the wireless device via the first access type is unsuccessful is further based at least in part on receiving the request to provide the SMS message to the wireless device via the second access type.

11. The cellular network entity of claim 9, wherein the cellular network entity is further configured to:
provide a response to the request to provide the SMS message indicating that an unsuccessful attempt to provide the SMS message to the wireless device was performed if attempting to provide the SMS message to the wireless device via the first access type is unsuccessful; and
receive a request to re-try providing the SMS message to the wireless device,
wherein attempting to provide the SMS message to the wireless device via a via the second access type of the at least two access types if attempting to provide the SMS message to the wireless device via the first access type is unsuccessful is further based at least in part on receiving the request to re-try providing the SMS message to the wireless device.

12. The cellular network entity of claim 11,
wherein the response further indicates that the unsuccessful attempt to provide the SMS message to the wireless device was performed via the first access type.

13. The cellular network entity of claim 11,
wherein the response further indicates that the unsuccessful attempt comprises a temporary failure to deliver the SMS message to the wireless device.

14. The cellular network entity of claim 11, wherein the cellular network entity is further configured to:
store information indicating that an unsuccessful attempt to provide the SMS message to the wireless device via the first access type was performed if attempting to provide the SMS message to the wireless device via the first access type is unsuccessful,
wherein attempting to provide the SMS message to the wireless device via the second access type of the at least two access types if attempting to provide the SMS message to the wireless device via the first access type is unsuccessful is further based at least in part on the stored information indicating that the unsuccessful attempt to provide the SMS message to the wireless device via the first access type was performed.

15. The cellular network entity of claim 9, wherein the cellular network entity is further configured to:
provide a response to the request to provide the SMS message indicating that delivery of the SMS message failed if attempting to provide the SMS message to the wireless device via the first access type is unsuccessful and attempting to provide the SMS message to the wireless device via the second access type is also unsuccessful.

16. The cellular network entity of claim 9, wherein the cellular network entity is further configured to:
determine that the attempt to provide the SMS message to the wireless device via the second access type is unsuccessful;
determine that delivery of the SMS message failed if attempts to provide the SMS message to the wireless device via the first and second access types are unsuccessful; and
provide, to the SMSF, a response to the request to provide the SMS message indicating that delivery of the SMS message failed.

17. A short message service function (SMSF) of a cellular network, comprising:
a network interface; and
a processing element coupled to the network interface;
wherein the SMSF is configured to:
provide a request to provide a short message service (SMS) message to a wireless device, wherein the request to provide the SMS message is provided to an access and mobility management function (AMF) of the cellular network, wherein the wireless device is registered with the cellular network via at least two access types;
receive a response to the request to provide the SMS message indicating that an unsuccessful attempt to provide the SMS message to the wireless device was performed; and
provide a request to re-try providing the SMS message to the wireless device to the AMF of the cellular network.

18. The SMSF of claim 17,
wherein the request to provide the SMS message further comprises an indication to attempt to provide the SMS message to the wireless device via a first access type,
wherein the request to re-try providing the SMS message further comprises an indication to attempt to provide the SMS message to the wireless device via a second access type.

19. The SMSF of claim 17,
wherein the at least two access types comprise a 3GPP access type and a non-3GPP access type.

20. The SMSF of claim 17, wherein the SMSF is further configured to receive, from the AMF, a response indicating that delivery of the SMS message failed.

* * * * *